(12) United States Patent
Ballestad et al.

(10) Patent No.: US 9,514,508 B2
(45) Date of Patent: Dec. 6, 2016

(54) MAPPING FOR DISPLAY EMULATION BASED ON IMAGE CHARACTERISTICS

(71) Applicant: DOLBY LABORATORIES LICENSING CORPORATION, San Francisco, CA (US)

(72) Inventors: Anders Ballestad, Vancouver (CA); Robin Atkins, Campbell, CA (US); Lewis Johnson, Delta (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 410 days.

(21) Appl. No.: 14/358,117

(22) PCT Filed: Dec. 6, 2012

(86) PCT No.: PCT/US2012/068129
§ 371 (c)(1),
(2) Date: May 14, 2014

(87) PCT Pub. No.: WO2013/086107
PCT Pub. Date: Jun. 13, 2013

(65) Prior Publication Data
US 2014/0333660 A1 Nov. 13, 2014

Related U.S. Application Data

(60) Provisional application No. 61/568,636, filed on Dec. 8, 2011.

(51) Int. Cl.
*G09G 5/02* (2006.01)
*G06T 1/20* (2006.01)
(Continued)

(52) U.S. Cl.
CPC ............... *G06T 1/20* (2013.01); *G06K 9/6202* (2013.01); *G06T 11/001* (2013.01); *G09G 5/00* (2013.01); *G09G 5/02* (2013.01)

(58) Field of Classification Search
CPC .................................... H04N 1/60; G09G 5/06
See application file for complete search history.

(56) References Cited

U.S. PATENT DOCUMENTS 6,774,875 B2   8/2004 Tong
6,795,063 B2   9/2004 Endo
(Continued)

FOREIGN PATENT DOCUMENTS

EP      2474970       7/2012
WO   2004/079704     9/2004
(Continued)

OTHER PUBLICATIONS

Glassner, A.S. et al "Device-Directed Rendering" ACM Transactions on Graphics, vol. 14, No. 1, pp. 58-76, published in Jan. 1995.
(Continued)

*Primary Examiner* — Phi Hoang

(57) ABSTRACT

An emulator yields modified image data that predicts the appearance of image content on a target display. The emulator generates modified image data based in part on the image content. The emulator may perform a transformation in which one or more parameters representative of features such as black level and/or white level of the target display are functions of image statistics for the image content.

17 Claims, 11 Drawing Sheets

(51) Int. Cl.
  *G09G 5/00* (2006.01)
  *G06K 9/62* (2006.01)
  *G06T 11/00* (2006.01)

(56) References Cited

U.S. PATENT DOCUMENTS

| | | | |
|---|---|---|---|
| 7,317,462 | B2 | 1/2008 | Lu |
| 7,352,410 | B2 | 4/2008 | Chou |
| 7,746,411 | B1 | 6/2010 | Balram |
| 7,821,474 | B2 | 10/2010 | Marcu |
| 8,681,189 | B2 | 3/2014 | Wallener |
| 2002/0080168 | A1* | 6/2002 | Hilliard ............... G06F 3/14 715/744 |
| 2006/0238551 | A1 | 10/2006 | Dalal |
| 2006/0251323 | A1 | 11/2006 | MacKinnon |
| 2007/0109321 | A1 | 5/2007 | Yu |
| 2008/0062164 | A1* | 3/2008 | Bassi ................. H04N 9/3147 345/214 |
| 2009/0052774 | A1 | 2/2009 | Yoshii |
| 2009/0109344 | A1 | 4/2009 | Ollivier et al. |
| 2009/0244386 | A1 | 10/2009 | Norgaard |
| 2009/0278867 | A1 | 11/2009 | Brown Elliott |
| 2009/0289968 | A1 | 11/2009 | Yoshida |
| 2010/0053222 | A1* | 3/2010 | Kerofsky ............ G09G 3/3406 345/690 |
| 2010/0134529 | A1* | 6/2010 | Doser .................. H04N 1/60 345/690 |
| 2010/0265264 | A1* | 10/2010 | Doser .................. G09G 5/02 345/590 |
| 2010/0277492 | A1 | 11/2010 | Frederick |
| 2010/0295864 | A1* | 11/2010 | Kerofsky ............ G09G 3/3426 345/589 |
| 2011/0109661 | A1 | 5/2011 | Lee |
| 2012/0032969 | A1* | 2/2012 | Sugiyama ........... G06F 3/1431 345/589 |
| 2013/0038790 | A1* | 2/2013 | Seetzen ............... G09G 5/02 348/453 |

FOREIGN PATENT DOCUMENTS

| | | |
|---|---|---|
| WO | 2006/106457 | 10/2006 |
| WO | 2007/047537 | 4/2007 |
| WO | 2011/025004 | 3/2011 |
| WO | 2011/106247 | 9/2011 |

OTHER PUBLICATIONS

Chen, Hwann-Tzong, et al "Tone Repduction: A Perspective from Luminance-Driven Perceptual Grouping" International Journal of Computer Vision, published in Dec. 2005, published by Kluwer Academic Publishers.

Guarnieri, G. et al "Nonlinear Mapping for Dynamic Range Compression in Digital Images" Proc. of the SPIE—The International Society for Optical Engineering, vol. 6497, Feb. 15, 2007.

Mantiuk, R. et al "Predicting Visible Differences in High Dynamic Range Images-Model and its Calibration" Proc. of the SPIE—The International Society for Optical Engineering, vol. 5666, No. 1, pp. 204-14, published in Mar. 2005.

Zhang, W. et al "Adaptive Exponential Mapping for Displaying High Dynamic Range Images" published by Society for Imaging Science and Technology, Springfield, VA, USA. Final Programs and Proceedings, International Congress of Imging Science, May 7-11, 2006.

Majumder, Aditi "Luminance Management for Seamless Multi-Projector Displays" SID International Symposium—Digest of Technical Papers, May 2005.

Tyler, C.W. "Colour Bit-Stealing to Enhance the Luminance Resolution of Digital Displays on a Single Pixel Basis" Spatial Vision, vol. 10, No. 4, pp. 369-77, 1997.

\* cited by examiner

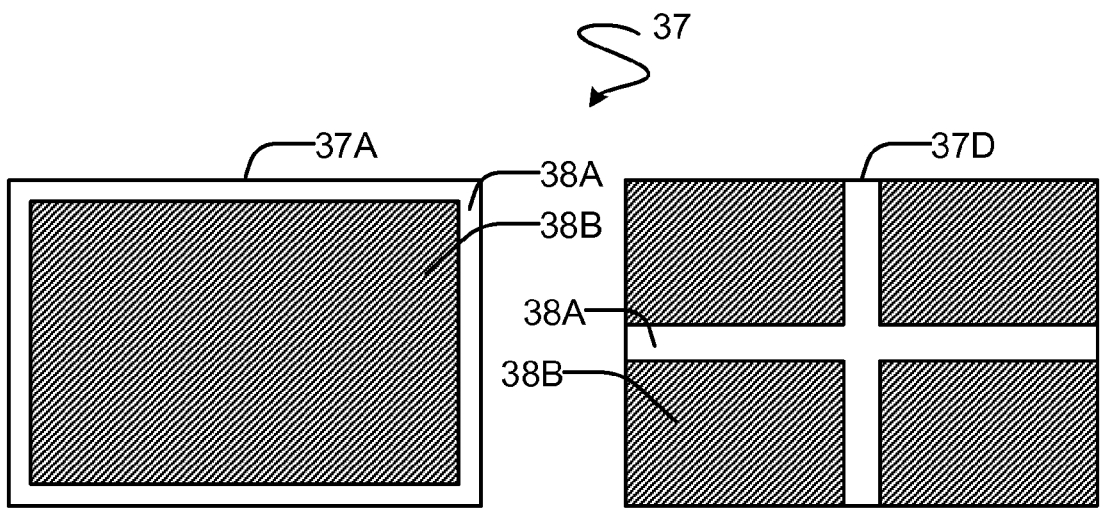
FIGURE 3A
FIGURE 3D
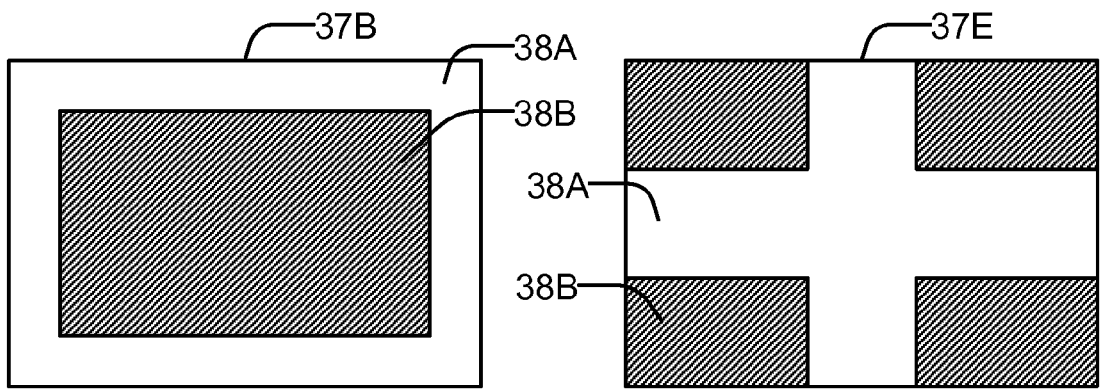
FIGURE 3B
FIGURE 3E
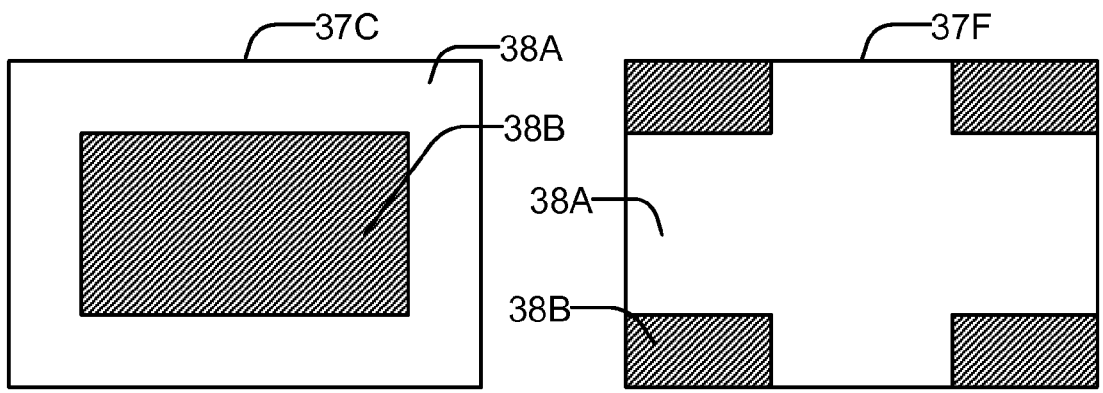
FIGURE 3C
FIGURE 3F

MAPPING FOR DISPLAY EMULATION BASED ON IMAGE CHARACTERISTICS

This application claims priority to U.S. Provisional Application No. 61/568,636, filed Dec. 8, 2011, which is hereby incorporated by reference in its entirety.

TECHNICAL FIELD

The invention relates to displaying and processing images. Embodiments provide methods and apparatus that emulate the display of images on displays. The emulation may be based on characteristics of displayed images.

BACKGROUND

Displays such as televisions, computer monitors, displays in portable devices, digital cinema displays, special purpose displays such as virtual reality displays, vehicle simulators, advertising displays, medical imaging displays, stadium displays, and the like are widespread.

A wide range of display technologies are now available. For example, there are plasma displays, LCD displays backlit by a variety of types of light sources such as LEDs of various types, fluorescent lamps or high-intensity incandescent lamps, local-dimming backlit displays; global-dimming backlit displays; reflective displays; CRT-based displays, digital cinema displays, OLED displays etc. A particular display combines display hardware with video signal processing components that receive video signals and drive display hardware to display video content of the video signals.

Different displays may vary significantly with respect to features such as:
- the color gamut that can be reproduced by the display;
- the maximum brightness achievable;
- contrast ratio;
- resolution;
- acceptable input signal formats;
- color depth;
- white level;
- black level;
- white point;
- grey steps;
- etc.

The appearance of an image specified by image signals such as digital image data can vary significantly depending on what display the image is displayed on. These differences arise as a result of the combination of: any image processing performed in the display and physical characteristics of the display itself.

The appearance of images displayed on a display is also affected by ambient lighting conditions. Video or other images presented under theater conditions (low ambient lighting) may be perceived by viewers significantly differently than the same video or other images would be perceived when viewed under conditions with significant ambient light. Further, the characteristics (such as the color temperature, direction of incidence etc.) of ambient light can affect a viewer's perception of displayed image content.

The creator of a video production or other image may set tones and colors of pixels in the image with the intention that, when viewed, the image has a desired appearance which agrees with the creator's creative intent. For example, a creator may wish some scenes to have a darker, more oppressive, feel than others. The creator may wish certain features depicted in a scene to stand out or to be less prominent. The creator may wish to have colors seem extra vivid in some scenes and more muted in others. Adjusting tones and colors of pixels in an image may include performing color grading (or 'color timing') on the source video data. Color grading may be performed using a hardware/software system that permits a user to change the video data in various ways to achieve a desired appearance.

Because displays can perform very differently, the same image content may appear different when viewed on different displays. Image content that is pleasing to look at when viewed on one display may be less pleasing when viewed on another display having different capabilities. A creator of an image may desire that the image have an appearance, when displayed that matches the creator's creative intent. Image content that matches a creator's creative intent when displayed on some displays may depart from the creator's creative intent in one or more ways when viewed on other displays.

There is a need for effective ways to predict the appearance of images when viewed on specific displays or types of displays.

SUMMARY

This invention has a number of aspects. These include, without limitation: methods for processing image data to indicate the appearance of images encoded by the image data on one or more target displays; apparatus for processing image data to indicate the appearance of images encoded by the image data on one or more target displays; and non-transitory media carrying computer software and/or logic configuration instructions that, when executed on a computer or other configurable logic apparatus cause the computer or other configurable logic apparatus to be configured to perform a method as described herein.

One example aspect provides an image processing method comprising: obtaining one or more image statistics for image content to be processed; based on the one or more image statistics computing one or more parameters related to one or more of contrast, black level and white level of a target display; and transforming the image content into modified image content using the parameters.

In some embodiments the parameters are derived from measurements made on the target display. The parameters may, for example, indicate relationships between one or more image statistics (for example, average luminance or color saturation) and one or more characteristics of the target display (for example, black level, white level and/or effective primary colors).

For example, in some embodiments the image statistics comprise an average luminance of an image specified by the image content. Computing the one or more parameters may comprise computing a white level for the target display based on the average luminance.

In some embodiments, image statistics such as average luminance are determined globally (e.g. for all or most of an image) and in other embodiments the image statistics are determined locally (e.g. for areas of image content in the vicinity of a pixel).

In some embodiments the method comprises obtaining one or more color image statistics relating to relative proportions of primary colors in image content to be processed; based on the one or more color image statistics computing chromatic shifts for one or more primary colors of the target display; and applying the chromatic shifts to yield effective primary colors for the target display. Transforming the image content into the modified image content may comprise applying a transformation based at least in part on the effective primary colors.

Another example aspect provides an image processing method. The method comprises obtaining one or more color image statistics relating to relative proportions of primary colors in image content to be processed; based on the one or more color image statistics computing chromatic shifts for one or more primary colors of a target display; applying the chromatic shifts to yield effective primary colors for the target display; and transforming the image content into modified image content based on the effective primary colors.

In some embodiments, computing the chromatic shifts for a first one of the primary colors of the target display comprises computing linear functions of image statistics relating to relative proportions of at least second and third primary colors in the image content. The chromatic shifts may be vector quantities in which case, applying the chromatic shifts to yield effective primary colors for the target display may comprise determining a vector sum of the chromatic shifts.

Another non-limiting aspect provides apparatus for optimizing image data for display on a target display. The apparatus comprises one or more image adjusters connected to receive input image data and configured to: calculate one or more image statistics for image content to be processed; based on the one or more image statistics, and based on specification data relating to specifications of a target display, calculate one or more parameters related to one or more of contrast, black level and white level of a target display; and transform the image content into modified image content using the parameters.

Another example aspect provides apparatus for determining display specifications for a target display. The apparatus comprises: a source of image data to be displayed on a target display; a light meter operable to measure light produced by the image data at a location on the target display; and a display parameter calculator which uses the data from the light meter to calculate one or more display parameters. The image data may comprise a plurality of test patterns which each include at least one white area or at least one black area and are characterized by different values for average luminance or some other image characteristic. For example, the test patterns may be like those illustrated in FIGS. 3A, 3B, 3C, 3D, 3E, and 3F. The image data may comprise a plurality of test patterns which each include at least one area that is saturated in a primary color and are characterized by different values the amount of other colors present in the test pattern or some other image characteristic. For example, the test patterns may be like those illustrated in FIGS. 8A, 8B, 8C and/or 8D.

In some embodiments the apparatus is configured to determine display parameters indicative of one or more of: a color gamut that can be reproduced by the target display; a maximum brightness achievable; a contrast ratio; a resolution; a white level; a black level; and a white point.

Further aspects of the invention and features of example embodiments are illustrated in the accompanying drawings and described below.

BRIEF DESCRIPTION OF THE DRAWINGS

Non-limiting example embodiments are illustrated in the appended drawings. The embodiments and figures disclosed herein are to be considered illustrative rather than restrictive.

FIGS. 3A, 3B, 3C, 3D, 3E and 3F illustrate example test patterns useful for determining relationships between white level and/or black level for a target display and average luminance of an image to be displayed on the target display.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
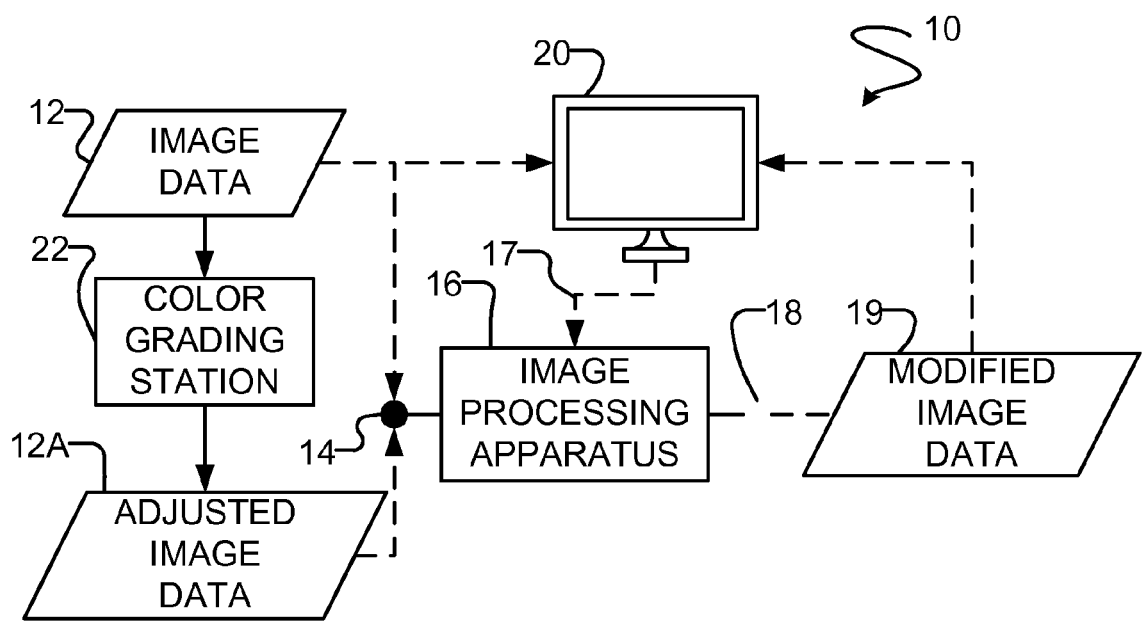
FIG. 1 illustrates schematically a system according to an example embodiment.

FIG. 1 illustrates schematically a system 10 according to an example embodiment. Image data 12 is provided at an input 14 of apparatus 16. The output 18 of apparatus 16 provides modified image data 19 which indicates the appearance that image data 12 will have when viewed on a particular target display. In the illustrated embodiment, a high-fidelity reference display 20 is provided. A user can view images based on image data 12 or modified image data 19 or both on reference display 20. In the illustrated embodiment image processing apparatus 16 optionally receives signals 17 which contain information indicative of properties of reference display 20. The properties may include one or more of color gamut, maximum brightness, black level etc., for example.

Apparatus 10 may be applied in various ways. For example, a user may create adjusted image data 12A using a color grading console 22 or other image editing apparatus capable of adjusting colors and/or tones in image data 12 to arrive at adjusted image data 12A that, when processed by image processing apparatus 16 yields modified image data 19 having a desired appearance when displayed. Since modified image data 19 emulates the appearance that the image data will have when viewed on a particular target display, adjusted image data 12A may be distributed by any suitable image data distribution technology for display on the target display.

Another application of apparatus 10 is to distribute modified image data 19 for display on the target display.

In some embodiments certain characteristics of the target display are provided to apparatus 10 by way of a data connection with the target display (e.g. a data connection over the internet or over a local wired or wireless network for example). In some embodiments certain characteristics of the target display are retrieved from a database which may be integrated with apparatus 10 or provided separately. In some embodiments apparatus 10 includes a data store containing information about the target display.

A feature of some embodiments of the invention is that a mapping between input image data (e.g. data 12 or 12A) and modified image data 19 depends at least in part on characteristics of the image data. Therefore, in some embodiments, it can be the case that certain input pixel values for a pixel of a first image may be mapped to first corresponding modified pixel values but the identical input pixel values for a pixel of a second image may be mapped to second modified pixel values different from the first modified pixel values.

In some embodiments, image processing apparatus 16 includes a function that estimates one or more of contrast, black level and white level of the target display (or of an area of the target display) based on one or more characteristics of the image to be displayed on the target display (or of an area of the image to be displayed on the target display). With this refinement, modified image data 19 can produce much more accurate rendering of images as they will appear on the target display than models that merely apply fixed black level, white level and gamma values for the target display. The information about the target display may include information that specifies the function.

For example, the image characteristics may be image statistics. An example of an image statistic that may be applied to determine one or more of contrast, black level and white level of the target display is average luminance of a frame to be displayed.

For some target displays, display characteristics such as the available contrast, black level and/or white level depend at least in part on characteristics of one or more previously-displayed images. For example, where a target display is displaying video images, the available contrast, black level and/or white level may depend at least in part on image statistics for one or more previous frames instead of, or in addition to, image statistics for a frame currently being displayed.

Figure 2:
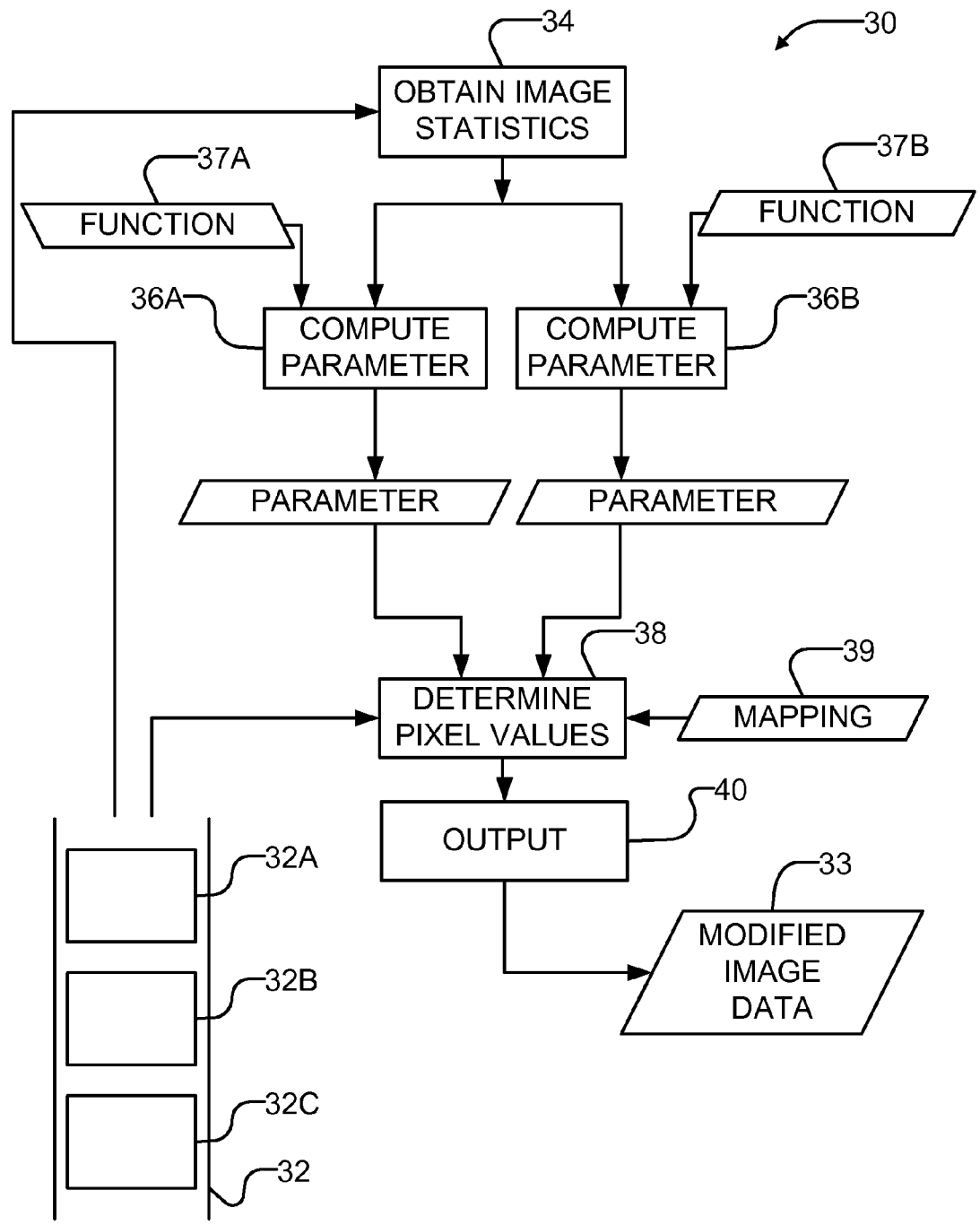
FIG. 2 illustrates a method according to an example embodiment.

FIG. 2 illustrates a method 30 according to an example embodiment of the invention. Method 30 processes image data 32 representing a plurality of video frames 32A, 32B, 32C etc. to be displayed on a target display. Block 34 obtains image statistics for frames 32A, 32B, 32C etc. In this example embodiment, the image statistics are average luminance. The image statistics may have been previously determined or block 34 may compute the image statistics from image data 32. In some embodiments the image statistics may have been previously determined and available as metadata associated with image data 32.

In some embodiments the image statistics may be determined at least in part with reference to information characterizing a source display for which the image data 32 was prepared. The information may, for example, comprise black level, white level, and/or color primaries for the source display. For example, some image data formats do not specify luminance directly. The average luminance of a frame in such a format can depend on the display used to view the frame. Some displays may adjust luminance of video content with reference to a source display associated with the video content in metadata or otherwise.

Based on the image statistics from block 34, blocks 36A and 36B compute parameters related to the contrast, black level and/or white level of the target display. In the illustrated embodiment, blocks 36A and 36B apply functions 35A and 35B respectively. Functions 35A and 35B may be implemented as lookup tables, as calculations performed by a data processor, by fixed or configurable logic circuits or the like. For example, an output pixel value L may be given by:

$$L = f(V, \alpha, \beta \ldots) \quad (1)$$

where V is a pixel value (e.g. a value representing luminance) in input image data 32 and $\alpha$ and $\beta$ are parameters that characterize the target display. These parameters may, for example, characterize how the behavior of the target display changes in response to characteristics such as average luminance or color content of an image being viewed. In some embodiments, apparatus performing method 30 obtains these parameters by receiving the parameters from the target display; by receiving user input specifying the parameters; by retrieving the parameters from an external database, server, or other information store; and/or by virtue of the parameters being locally available to the apparatus.

In an example embodiment, blocks 36A and 36B calculate values for the parameters á and â in the expression:

$$L = \alpha V^\gamma + \beta \quad (2)$$

where: $\gamma$ is a gamma value for the target display (which may optionally be a fixed value); $\alpha$ is a parameter corresponding to an estimated white value; $\beta$ is a parameter corresponding to an estimated black level; V is a pixel value (e.g. a value representing luminance) in input image data 32 and L is a corresponding pixel value in output image data. In some embodiments, $\alpha$ and $\beta$ are functions of a single variable. In some embodiments the single variable is average luminance for the image specified by image data 32.

In the illustrated embodiment, two parameters are determined. In general, one or more parameters is determined.

Block 38 determines pixel values for modified image data 33 using a mapping 39 based on the parameter(s) determined in blocks 36A and 36B (for example using Equation (2)) and outputs the result in block 40 as modified image data 33.

Blocks 36A and 36B may determine the parameter values once for an entire image (e.g. an entire video frame or group of video frames). In the alternative, blocks 36A and 36B may determine parameter values separately for different regions within an image. In some embodiments, some features of mappings between input pixel values and modified pixel values are based on global characteristics of an image and other characteristics of the mapping may be based on local characteristics of the image. For example, in some embodiments, a mapping is determined at least in part by parameter values corresponding to a black level and a white point. The black level may be determined based on local characteristics of an image (for example, average luminance of an area surrounding the pixel or average contrast within a region including the pixel) while the white point may be determined based on one or more global characteristics of the image (for example an average luminance of the image).

The functions which determine values for the parameters in blocks 36A and 36B may be determined empirically by, for example, displaying test patterns on a target display and measuring the black level and white level from the screen of the target display. FIGS. 3A, 3B, 3C, 3D, 3E and 3F illustrate example test patterns 37A, 37B, 37C, 37D, 37E and 37F (collectively test patterns 37). Each test pattern 37 has white areas 38A and dark (black) areas 38B. Test patterns 37A, 37B and 37C differ from one another in the relative proportion of the image occupied respectively by dark areas 38B and white areas 38A. Test patterns 37 have different image statistics (e.g. different average luminances).

Test patterns 37A, 37B and 37C have the same proportions of dark areas 38B and light areas 38A as test patterns 37D, 37E and 37F respectively. A location in test patterns 38A to 38C is dark whereas the same location in test patterns 38D to 38F is white. The location may be a central location, for example.

Displaying the test patterns in turn and measuring luminance at the central location permits black level and white point for the target display to be measured for each of a number of average luminances. One can measure black level and white point for a few such test patterns and then fit a suitable curve to the results to obtain a function relating black level to average luminance and a function relating white level to average luminance. Many variations in the layout of dark and white areas in the test patterns are possible. In the illustrated embodiment, each test pattern 37 comprises a dark central area and has white areas of different extent outside of the dark central area. For example, the dark central area may comprise a black rectangle surrounded by a white band. The white band may take up the rest of the area of the test pattern. In the illustrated embodiment, each test pattern 38 comprises a black rectangle in each corner with the remainder of the test pattern white.

Those of skill in the art will realize that many variations in the layout of test patterns 37 or 38 are possible while providing a set of test patterns permitting measurement of white level and/or black level as a function of the average luminance of an image being displayed on the target display.

It is not mandatory that the mapping between input pixel values and modified pixel values be defined by two parameter values (for example those determined in blocks 36A and 36B). The mapping may be specified by one, two, three or more parameter values. In some embodiments, the mapping comprises setting output modified pixel values corresponding to minimum and maximum input pixel values and applying a response function to determine output modified pixel values corresponding to input pixel values between the minimum and maximum input pixel values. In some embodiments the output modified pixel values are values which relate linearly to luminance.

In different embodiments, one, two or all of: the output modified pixel value corresponding to the minimum input pixel value; the output modified pixel value corresponding to the maximum input pixel value and the response are adapted depending on statistics of an image being displayed.

Figure 4:
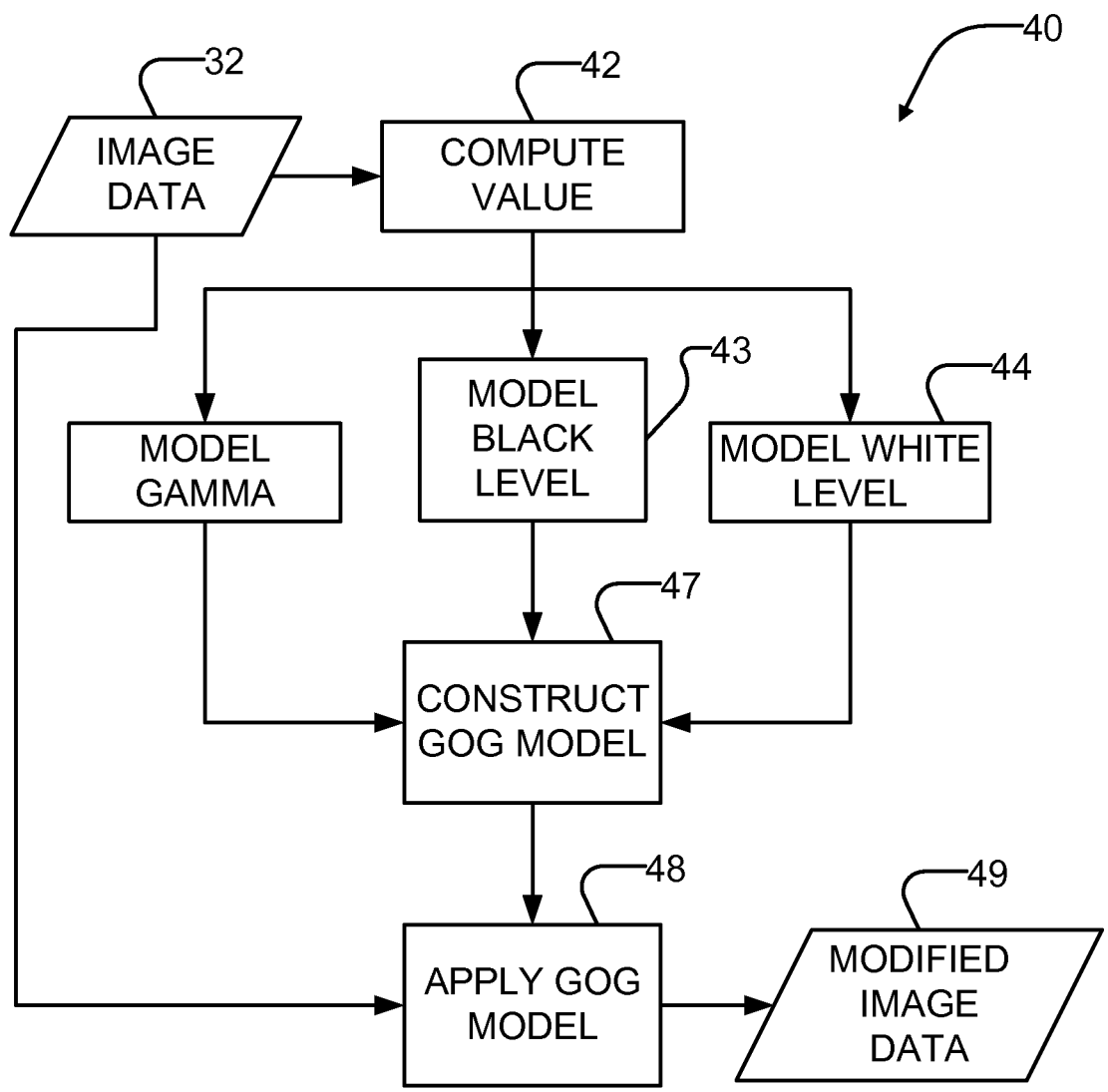
FIG. 4 is a flowchart illustrating an example method for determining parameters for a mapping based on global characteristics of image data.

Another example embodiment is illustrated in FIG. 4 which is a flowchart illustrating an example method 40 for determining parameters for a mapping based on global characteristics of image data. In block 42 method 40 computes a value characterizing the image. In the illustrated embodiment the value is an arithmetic mean of the image. For example, block 42 may sum luminance values for all pixels in the image and divide the result by the number of pixels in the image. In other embodiments, other values are computed such as a geometric mean luminance, median luminance, weighted mean luminance, total luminance or the like.

In block 43 method 40 uses the arithmetic mean from block 42 as an input into a model for the black level Lmin of a target display. In an example embodiment the model is a linear function of the arithmetic mean. For example, the model may be given by:

$$L_{min}=a \times u+b \tag{3}$$

where a and b are parameters relating the arithmetic mean u to the black level response of the target display.

In block 44 method 40 uses the arithmetic mean from block 42 as an input into a model for the white level Lmax of the target display. In an example embodiment the model is a linear function of the arithmetic mean. For example, the model may be given by:

$$L_{max}=c \times u+d \tag{4}$$

where c and d are parameters relating the arithmetic mean u to the white level response of the target display.

In block 45 method 40 uses the arithmetic mean from block 42 as an input into a model for the gamma, G of the target display. In an example embodiment the model is a linear function of the arithmetic mean. For example, the model may be given by:

$$G=e \times u+f \tag{5}$$

where e and f are parameters relating the arithmetic mean u to the gamma response of the target display.

It is not mandatory that the models applied in blocks 43, 44 and/or 45 are linear models. A non-linear model could be applied for any one or more of these models. Any one or more of blocks 43, 44 and/or 45 may be implemented by providing a lookup-table (LUT) that provides values for Lmin, Lmax, and/or G in response to the input of the arithmetic mean or other image characteristic.

In block 47 the values of Lmin, Lmax, and G are used to construct a gain-offset-gamma (GOG) model. The model may, for example, be given by:

$$L=L_{max} \times V^G + L_{min} \tag{6}$$

or for another example by:

$$L=(L_{max}-L_{min}) \times V^G + L_{min} \tag{7}$$

Block 48 applies the GOG model of block 47 to process image data 32 to yield modified image data 49.

A method like method 30 or 40 may be performed on image data 32 represented in a suitable color space. It can be convenient to apply method 30 to image data formats that specify luminance separately from chrominance. Some examples of such image data formats are YUV, Y' UV, YCbCr, LUV, HSL, HSV.

A method like method 30 may also be performed on image data which specifies pixel values in other formats. For example, method 30 may be applied to image data in which pixel values are represented in a RGB color space. This may be done by computing values for parameters based on a weighted sum of R, G and B values for image data 32. In some embodiments, the weights applied in computing the weighted sum are derived from the relative energies required to drive the different primary colors in the target display. In embodiments where the image data is in an RGB format or the like, values for R, G and B can each be modified according to Equation (2). The same parameter values may be used in each case. The parameter values used may, for example, be averages of values determined for R, G and B channels separately.

In some embodiments emulation of a target display may be performed by applying the matrix operations:

$$\begin{pmatrix} X \\ Y \\ Z \end{pmatrix} = M \begin{pmatrix} r \\ g \\ b \end{pmatrix} + O \qquad (8)$$

where M is a matrix operator, O is a vector of offsets, r, g and b are input pixel values and X, Y and Z are output pixel values. The values of the elements of M and O may change based on the average pixel level of an image being displayed.

In some embodiments, the maximum brightness of the target display for each of a plurality of primary colors is measured separately. For example, test patterns like those shown in FIGS. 3A, 3B, 3C, 3D, 3E and 3F may be displayed on the target display for the case where the illuminated area 38A is each of red, green, blue and white. Black level and maximum luminance may be measured for each of these test patterns. From the known average luminance of each test pattern (which is different for different ones of the test patterns) one can derive relationships between black level and average image luminance and between white level and average image luminance. These relationships may be used to construct models of the type described above that may be applied to emulate the target display.

In some embodiments, modeling is performed that takes into account shifts in the saturation of primary colors as a function of the nature of the image data to be displayed. Light leakage can affect the color of a pixel. For example, a completely blue pixel may be desaturated by light leaking from neighboring red, green, or white pixels.

Some embodiments emulate the effect of image content on color by adapting the colors of primaries used to emulate a target display based on image statistics. For images with only a single color, the full primary color is achievable. However, where an image has increasing amounts of other colors, the primaries may become desaturated. Statistics indicative of the color of an image may be measured globally (for an entire image), in which case the same response may be applied to each pixel. In the alternative or in addition, such statistics may be measured locally (for example in regions centered on each pixel), in which case different responses may be applied to different pixels or to pixels in different regions of an image.

Methods and apparatus may be provided that map image luminance to emulate a target display based at least in part on image data characteristics or map image color to emulate a target display based at least in part on image data characteristics or both.

Figure 5:
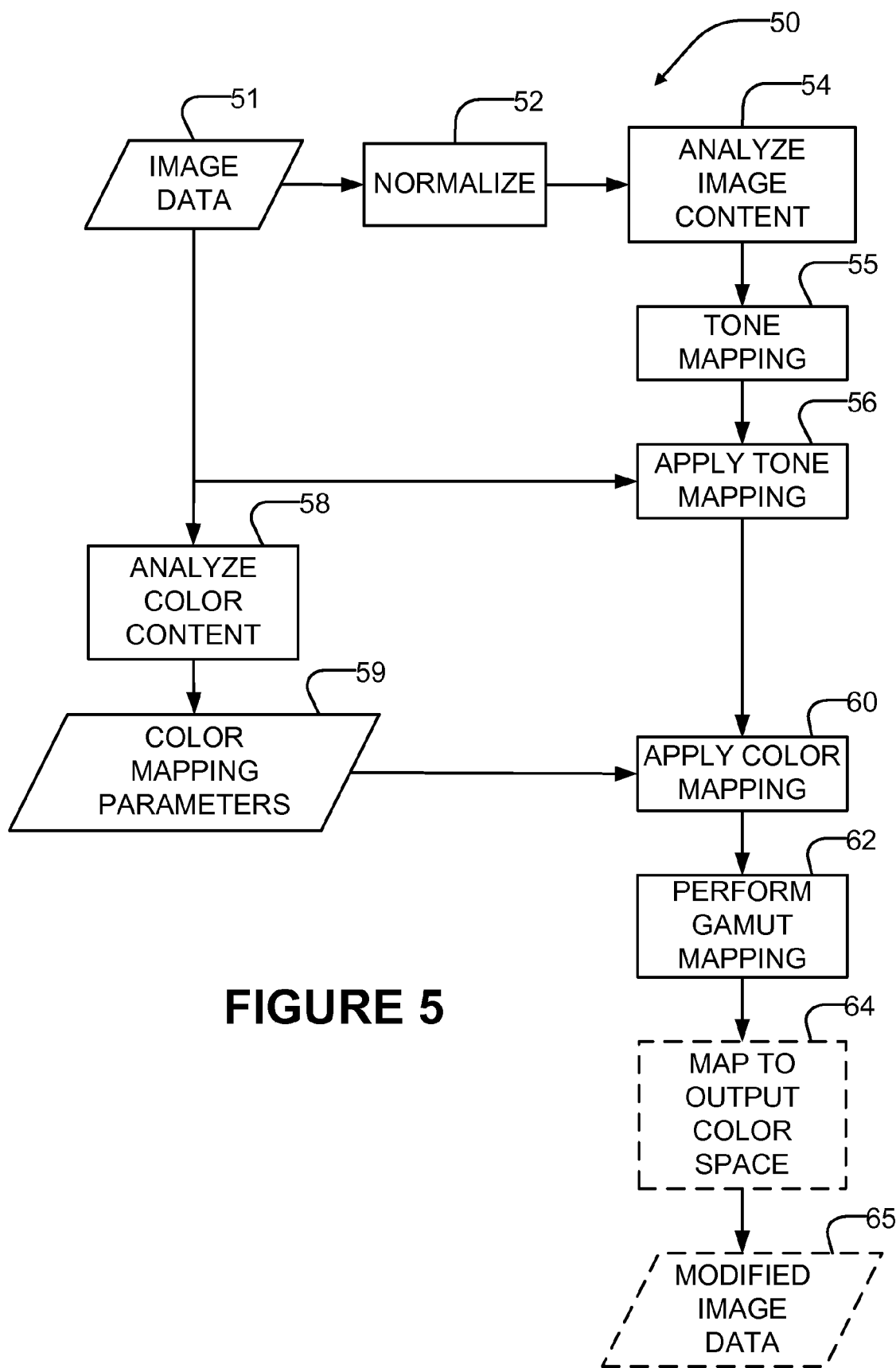
FIG. 5 is a flowchart illustrating an example method for mapping input image data to emulate a target display in which both luminance and color are adjusted by the mapping in a manner that is based at least in part on image characteristics.

FIG. 5 is a flowchart illustrating an example method 50 for mapping input image data to emulate a target display in which both luminance and color are adjusted by the mapping in a manner that is based at least in part on image characteristics.

Input image data 51 is normalized in block 52. The input image data may, for example, be RGB image data in which code values are provided for each pixel for each of red (R), green (G) and blue (B) channels. The code values may, for example, be values on the range of 0 to 255 or 0 to 1024 or 0 to 4096. In block 52 the values are scaled into a standard range, for example the range of 0 to 1. Block 54 analyzes the image content of input image data 51 and derives a luminance mapping (or 'tone' mapping) 55 from that image data. Block 54 may, for example, derive a mapping from characteristics of input image data 51 as is done in method 30 of FIG. 2 or method 40 of FIG. 4. Block 56 applies the mapping derived in block 54 to linearize the input image data.

Block 58 analyzes the color content of input image data 51 (block 58 may operate on raw input image data 51 or on data that has been processed by block 52 or block 54). Block 58 generates parameters 59 for a color mapping. In some embodiments, block 58 determines effective primary colors for a target display (taking into account desaturation of the primary colors in the target display). Block 60 implements a color mapping into a display color space for the target display based on the chromaticities of the effective primary colors or other parameters derived in block 58. Block 60 may, for example, apply a 3×3 transformation matrix to a set of RGB values provided at the input of block 60.

Block 62 performs gamut mapping into the available color gamut of the target display. For example, block 62 may map or clip pixel values that are outside of the gamut of the target display onto or into the boundary of the gamut of the target display.

Optional block 64 performs a mapping to a desired output color space. Block 64 may, for example, apply a 3×3 matrix transformation and output the result as modified image data 65.

Figure 6:
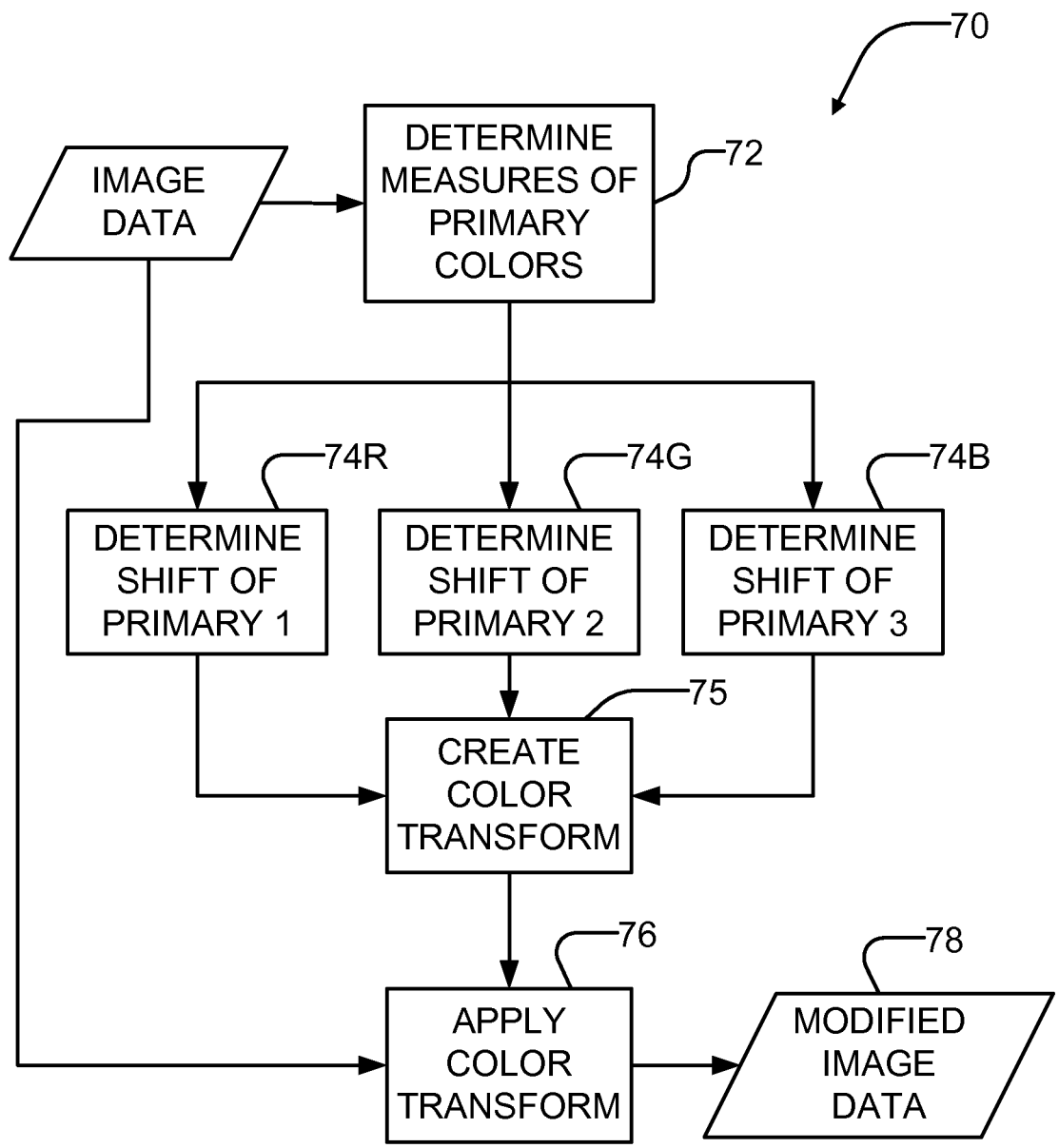
FIG. 6 is a flowchart illustrating an example method for determining a chromatic transformation.

FIG. 6 shows an example method 70 for determining a chromatic transformation. Method 70 may, for example, be applied in block 58 of method 50. Method 70 may be applied to each image to be displayed on a target display. In block 72, method 70 determines the relative amount of each primary color in the image. For example, the relative amounts of red, green and blue primaries in a RGB display may be determined by computing the ratios:

$$\frac{R}{R+G+B} \quad \frac{G}{R+G+B} \quad \frac{B}{R+G+B} \qquad (9)$$

where R, G and B are respectively the sums of the red, green and blue pixel values over the image (or over an area within the image). Block 72 may comprise performing a transformation into a display-referenced color space (such as an sRGB color space) as this may facilitate the processing of block 72.

Blocks 74R, 74G and 74B respectively determine parameters indicating amounts of desaturation of each primary resulting from mixing of light from other primaries. For example, for each primary, the relative amounts of the two (or more in some cases) other primaries may be applied to determine vectors in color space indicating the effective chromaticity of the primaries in the target display. For example, where the red primary of the target display has a chromaticity at coordinates to (x, y) in a color space then block 74R may determine a displacement of the effective red primary resulting from desaturation by the green primary according to:

$$x'_R = x_R - g \times \frac{G}{R+G+B} \qquad (10)$$

and $$y'_R = y_R - h \times \frac{B}{R+G+B} \qquad (11)$$

where g and h are parameters indicative of how sensitive the red primary of the target display is to desaturation by light from the green and blue primaries respectively, $x_R$ and $y_R$ are the coordinates for the chromaticity of the red primary of the target display and $x'_R$ and $y'_R$ are coordinates for the chromaticity of the red effective primary of the target display after desaturation by the other primaries has been taken into account.

The values for the parameters g and h (and for corresponding parameters for other primaries) may be determined by measurements made on a sample of the target display. For example, test patterns 75A through 75D (collectively test patterns 75) as shown respectively in FIGS. 8A to 8D may be displayed on the target display. Each of test patterns 75 has an area 76 of a first primary color. Surrounding area 76 is another area 77 in which different ones of test patterns 75 provide different proportions of the first primary color and a second primary color. In some embodiments one of the test patterns displays only the second primary color in area 77. By displaying the series of test patterns 75 and measuring the chromaticity of a point within area 76 one can determine a relationship between the effective chromaticity of the first primary color and the relative amount of the second primary color in the image (for example, one can find a value for a parameter value such as g or h that is a good fit to the results of such measurements).

For a target display having three primaries (e.g. R, G and B) one may provide six series of test patterns. Each series of test patterns may measure the effect on the chromaticity of one of the primary colors of one of the other two primary colors. For example, one series of test patterns may have saturated red in area 76 and various mixtures of red and blue in area 77. Another series of test patterns may have saturated red in area 76 and various mixtures of red and green in area 77. Another series of test patterns may have saturated blue in area 76 and various mixtures of blue and green in area 77. Another series of test patterns may have saturated blue in area 76 and various mixtures of blue and red in area 77. Another series of test patterns may have saturated green in area 76 and various mixtures of green and red in area 77. Another series of test patterns may have saturated green in area 76 and various mixtures of green and blue in area 77. The test patterns may be constructed such that the average luminance or other characteristics of the test patterns are essentially the same across the test patterns.

In an alternative embodiment, test patterns like test patterns 37 of FIGS. 3A, 3B, 3C, 3D, 3E and 3F (modified such that areas 38A display one primary color and areas 38B display a second primary color) may be used to measure the effect of desaturation on primaries.

Figure 7:
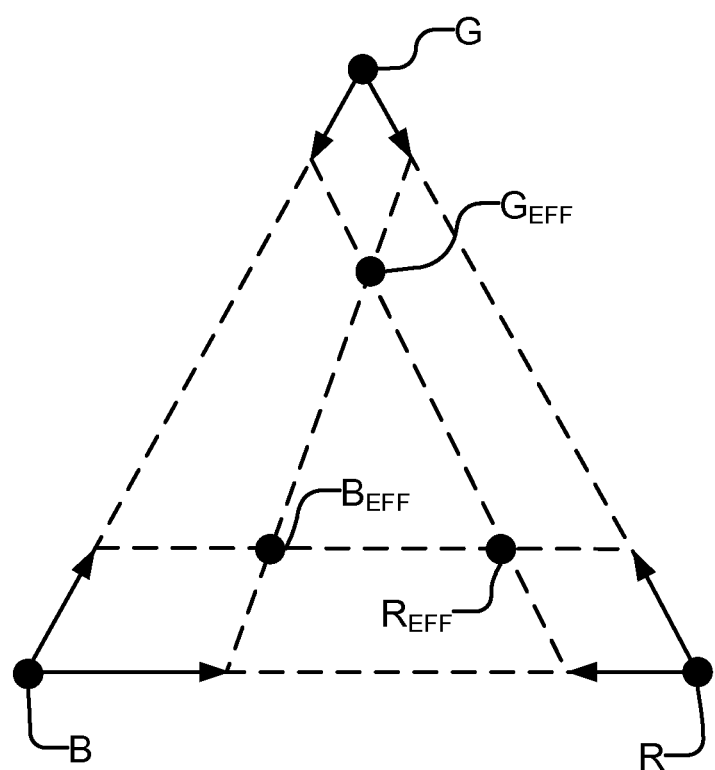
FIG. 7 is a diagram that illustrates the relative locations in color space of the red, green and blue primaries of an example target display and the effective red, green and blue primaries.

Equations (10) and (11) model the desaturation of primaries as linear relationships. Other functional forms are possible. For example, coordinates of an effective primary could be determined using non-linear functions of the other primaries. FIG. 7 illustrates the relative locations in color space of the red, green and blue primaries (R, G, and B) of an example target display and the effective red, green and blue primaries ($R_{EFF}$, $G_{EFF}$, $B_{EFF}$).

In block 75 the effective primaries determined in blocks 74R, 74G and 74B are used to create a color transform (e.g. a 3×3 color transformation matrix). In block 76 the color transform is applied to transform the colors of image pixels into a color space based on the effective primaries to yield modified image data 78.

A display may have more than three primary colors. A methodology similar to that described above may be applied to displays having four or more primary colors. An equivalent primary may be developed for one or more of the primary colors and a transformation may be performed which yields an output indicative of the appearance of the image when displayed using the equivalent primary colors in place of the corresponding primary colors.

Shifts in the effective color of non-primary colors such as white (as in a RGBW display) may also be estimated based on the intensities of other colors in the image. This may be done by moving the effective white point for a white color (or the effective chromaticity for another color) to new chromaticity coordinates according to a vector that is the vector sum of vectors each directed toward a primary color with a magnitude related to the intensity of that primary color in the image (or a local area within the image). The magnitude of the vectors may be linearly or non-linearly related to the intensity of each corresponding primary color.

A chromatic transformation may be generated for an entire image or, in the alternative, different chromatic transformations may be determined for local areas within an image. For example, values of R, G and B for use in Equations (9), (10) and (11) may be determined for a pixel in an image by summing or taking a weighted sum of pixel values in a region including the current pixel. The region may, for example comprise a region centered on the current pixel. The region could, for example, be rectangular or circular.

Where a weighted sum is taken, the weight may become smaller as distance from the current pixel is increased. A different chromatic transformation may be generated for each pixel. In the alternative, chromatic transformations may be generated and used for pixels within a local area of an image. Processing may be reduced by calculating the chromatic transformations based on a low-resolution version of the image (which may be generated, for example, by appropriate downsampling or decimation of the image data).

Some target displays may perform image processing that alters the appearance of pixels in an image. For example, a target display may incorporate image processing that performs gamut mapping. Examples of some situations where gamut mapping may be performed include:

a target display that maps pixel values in an absolute color space (such as Log Yuv, or XYZ) into a color space based on the physical primaries provided by the target display (e.g. a display-referred RGB color space);

a target display that includes image processing to map out of gamut colors into the color gamut of the target display. Such a target display may, for example, accept image data specified in a color space that can encode colors in a very large gamut (such as sRGB, P3, OCES, RIMM, xvYcc);

a target display that has more than three primaries but uses a three-primary interface that includes one or more virtual primaries. For example, a target display may have two green physical primaries and may assign values to the physical primaries based on a value for a single green virtual primary.

a target display may perform color boosting.

Some embodiments perform processing that emulates the effect of gamut mapping performed by a target display. In some embodiments, this processing is performed relatively simply. An example embodiment provides a transformation that converts input virtual primaries into the physical primaries of the target display. For example, the virtual primaries could be specified in a P3 color gamut, and the actual physical primaries could be represented in a sRGB color space. The transformation may be, for example a 3×3 color space transformation. If some resulting values have values that are invalid in the color space of the target display (e.g. sRGB values that are negative or greater than a maximum allowable value such as 1) the processing may clip or map the invalid values into a valid range in the target display color space.

In a simple example embodiment, negative sRGB values are clipped to zero and sRGB values greater than a maximum allowed value (e.g. 1) are clipped to one. Many alternative algorithms may be applied for processing values that are invalid in the color space of the target display. Some examples are as follows. Where one or more of the pixel values for a pixel is negative, add the same amount to all of the pixel values for the pixel such that all of the pixel values are at least zero. For example, one could add the absolute value of the most negative pixel value to each of R, G and B pixel values for a pixel. Where one or more of the pixel values for a pixel exceeds a maximum value (e.g. 1) scale the pixel values by dividing each pixel value by the same amount to bring the values into range while preserving the ratios between the pixel values. For example multiply the R, G, and B values for a pixel by the inverse of the largest one of the R G B values for the pixel. Where one or more pixel values for a pixel exceeds a maximum value or is less than a minimum value, perform a soft compression to bring the values into a valid range. For example, perform a soft compression on the R G B values where the soft compression brings R G B values approaching 1 and greater than 1 into the range [0,1].

In some embodiments, a rotation is applied using a 3×3 matrix transformation to help bring colors in the image data into the gamut of the target display.

The result of any of the above is that the processed pixel values will be within the gamut of the target display. Pixel values in the display color space may optionally be converted back into a virtual color space (for example by applying a 3×3 matrix transformation).

Figure 8:
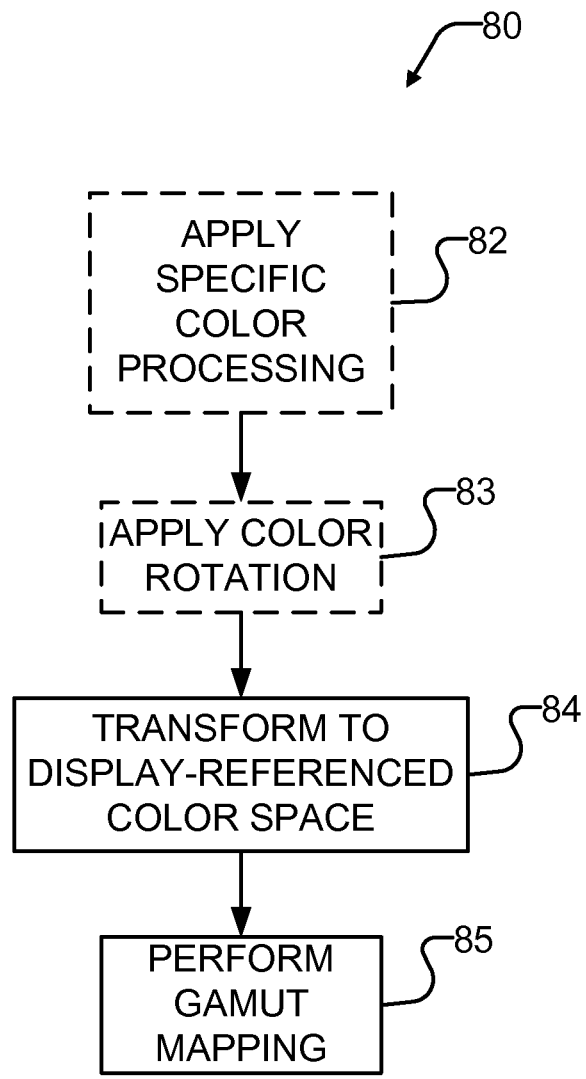
FIG. 8 is a flow chart illustrating a method for determining a chromatic transformation.
Figure 8A:
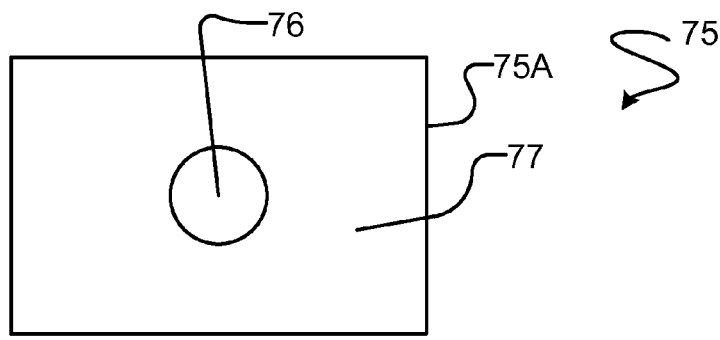
FIGS. 8A to 8D show example test patterns that may be displayed on a target display for use in determining parameters characterizing a chromatic shift based on characteristics of image data.
Figure 8B:
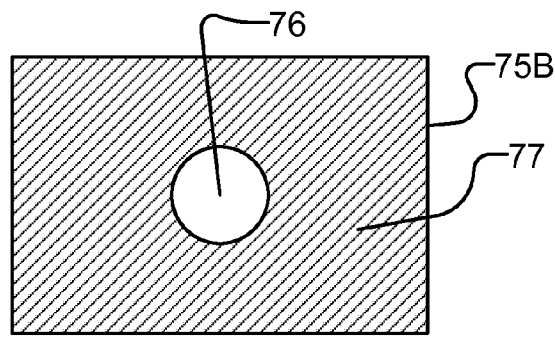
Figure 8C:
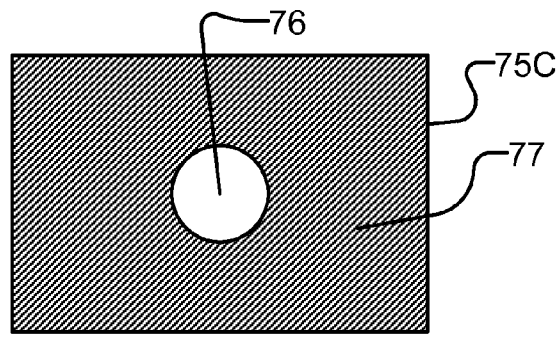
Figure 8D:
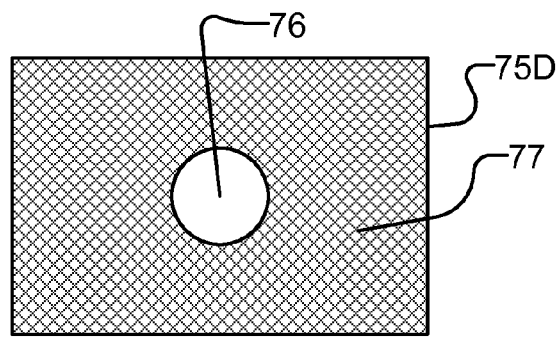

Processing to model gamut mapping that may occur within a target display may be combined with determining a chromatic transformation as discussed above with reference to method 70 of FIG. 6. For example, in one example embodiment, method 80 as illustrated in FIG. 8 is performed prior to or together with method 70. In (optional) block 82 a specific transformation is applied to pixel values for an image. Block 82 may be a specific transformation that the target display is known to perform. For example, a target display may perform image processing that involves tone mapping or gamut mapping of image data to be displayed (color boosting is one example of this). Optional block 83 performs a color space rotation. Block 84 performs a transformation into a display-referenced color space (if the image data is not already in that color space). Block 85 performs gamut mapping (e.g. clipping, compressing or the like) into a valid range of pixel values.

A model may be selected to mimic the gamut mapping performed by the target display. The model may be selected to provide acceptable emulation of the gamut mapping provided by the target display without requiring excessive processing.

While the operations described above have been explained separately for explanatory purposes, it may be convenient to combine two or more operations in practice. For example, two matrix multiplication operations may be combined into a single matrix multiplication. Also, those skilled in the art will understand that certain steps may be performed in alternative orders to arrive at the same result.

In addition to the display aspects listed above, it may also be desirable to model other characteristics of a target display. For example, a target display may incorporate filters for image sharpening, blurring and/or noise reduction. The effect of such filters may be emulated by providing corresponding filters in the image processing used to model the target display. As another example, the target display may resize images to be displayed (for example, the target display may change an aspect ratio of the image or change a spatial resolution of the image by some form of upsampling or downsampling). In some embodiments, resizing is performed as part of the emulation of the target display.

Some displays generate interpolated frames that are displayed between frames specified by image data. Such interpolation may be provided, for example, to make depictions of fast-moving objects clearer. Image statistics for an interpolated frame may differ from image statistics for non-interpolated frames in a manner that depends on how the target display performs interpolation. Some embodiments emulate interpolated frames by performing an interpolation to generate image data for an interpolated frame, generating image statistics for the interpolated frame and applying a method as described above to the interpolated frame. Some embodiments ignore the fact that a target display may insert interpolated frames between frames specified by image data. Some embodiments combine image statistics for frames before and after an interpolated frame (e.g. by averaging). such methods may avoid computing image statistics for the interpolated frame.

As noted above, some aspects of the performance of a target display may depend at least in part on previously-displayed frames. For example, where the target display is of a type that has a global dimming backlight (i.e. the display has a backlight that is controlled to be brighter or dimmer based on the image content to be displayed) the display of one frame may effect the performance of the target display in one or more subsequent frames. This is especially the case where the target display limits the rate of change of luminance of the backlight. As another example, the white level achievable by a target display may depend on the capacity of a power supply of the target display. The display of one or more very bright frames may limit the white level achievable in a subsequent frame displayed before the power supply has had time to recover from displaying the very bright frame(s).

In some embodiments, some or all features of the emulation described herein may be performed based on image data for one or more previous frames. For example, image data for one frame may be applied to the emulation of the next frame (or another subsequent frame). Other example embodiments use image statistics for previous frames to model some features of an emulation but not others. For example, white level, or in some cases white level and black level, may be based at least in part on image statistics for one or more previous frames while other features of the emulation such as chromaticity transformations and/or black level may be based on image data for a current frame.

Image statistics for one or more previous frames may be used in an emulation in combination with image statistics for a current frame. For example, for one or more features of a model, the emulation may be based on a weighted average of image statistics of a current frame and image statistics for one or more previous frames.

In some embodiments, some features of the emulation described herein may be performed based on image statistics for a local area within an image while other features are performed based on image statistics for an entire image. For example, white level may be determined based on image statistics for an entire image while other features such as black level and chromaticity transformations may be based on image statistics for a local area around a pixel for which emulation is being performed.

In some embodiments, some features of the emulation are based both on image statistics for an entire image and for local image statistics. For example in a target display, a white level for a pixel may be affected both by limitations of a power supply or light source driving circuit in the display and by the local environment of a pixel being processed (e.g. the achievable white level may be different depending on whether the pixel is located in a region of bright pixels or is surrounded by mostly dark pixels). In such embodiments white level may be determined based both on overall image statistics for the image being displayed (and/or for one or more previous frames) and for a local area around the pixel in question. One or the other of these values may be selected (e.g. the emulation may use the lower one of these values) or the values may be combined (e.g. by averaging, weighted averaging, or the like) to establish a white level to be applied in emulating the appearance of the pixel in question.

Figure 9:
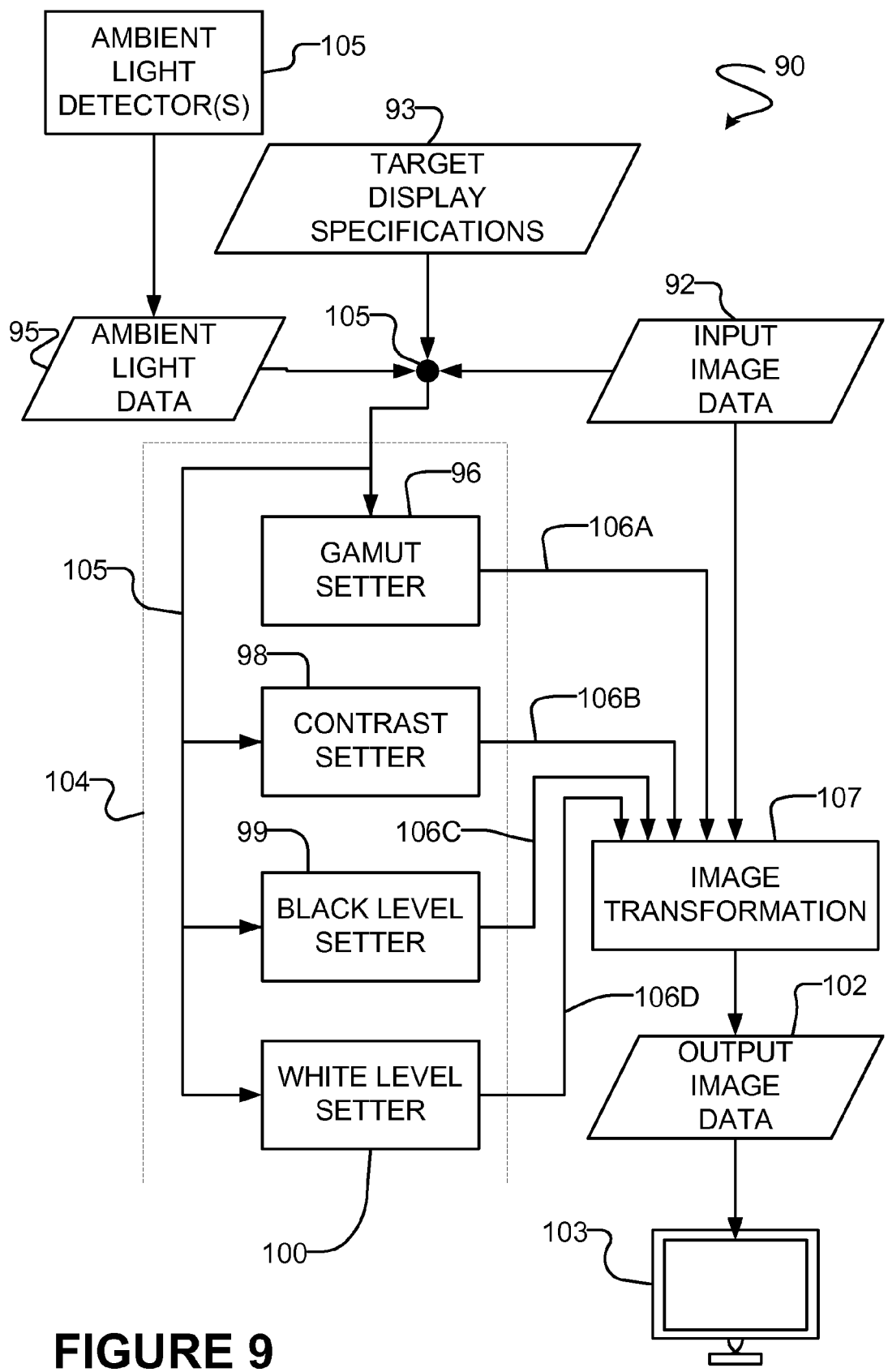
FIG. 9 illustrates an apparatus which can be used to adjust input image data to create output image data to be displayed on a target display.

FIG. 9 illustrates apparatus 90 according to a non-limiting example embodiment. Apparatus 90 can be used to adjust input image data 92 to create output image data 102 to be displayed on a target display 103.

Apparatus 90 comprises a series of setters 104. In the illustrated embodiment, setters 104 comprise a gamut setter 96, a contrast setter 98, a black level setter 99 and a white level setter 100. Setters 104 may operate in series and/or in parallel to one another. Each setter 104 may comprise software executing on a data processor, application specific hardware, or a combination of hardware and a data processor configured with software to perform adjustments to a transformation as described herein. Setters 104 may be separate or the functions of two or more setters 104 may be combined. Apparatus according to other embodiments may lack some of the setters depicted in FIG. 9. Setters 104 are illustrated as being discrete entities for example only. Apparatus may include circuitry and/or programmable processors configured to perform a plurality of adjustments together.

Setters 104 receive input data 105 and produce output signals 106 that control aspects of a transformation unit 107 operating on input image data 92 to yield output image data 102. Input data 105 includes reference display specifications 93 and input image data 92. Input data 105 optionally includes ambient light data 95. Ambient light data 95 may be produced by one or more ambient light detectors 105, which may be located on or near the target display 103, and/or received from user input indicating an ambient light level. The target display specifications 93, may include information about the features and capabilities of the target display 103 such as:
  the color gamut that can be reproduced by the display;
  a relationship between the appearance of primary colors and color saturation of image data and/or relationship(s) between achievable color gamut and one or more image statistics;
  the white level;
  a relationship between white level and average image luminance or other image statistics;
  black level;
  a relationship between black level and average image luminance or other to image statistics;
  mid-range contrast;
  a relationship between mid-range contrast and average image luminance or other image statistics;
  resolution;
  acceptable input signal formats;
  color depth;
  white point;
  grey steps;
  etc.

Setters 104 control a transformation unit 107 which may adjust the input image data 92 in any suitable manner including the specific example systems and methods described herein and combinations and variations on such systems and methods.

Setters 104 may share data with one an other (e.g., the operation of the contrast setter may rely on data output by the white level setter).

Figure 10:
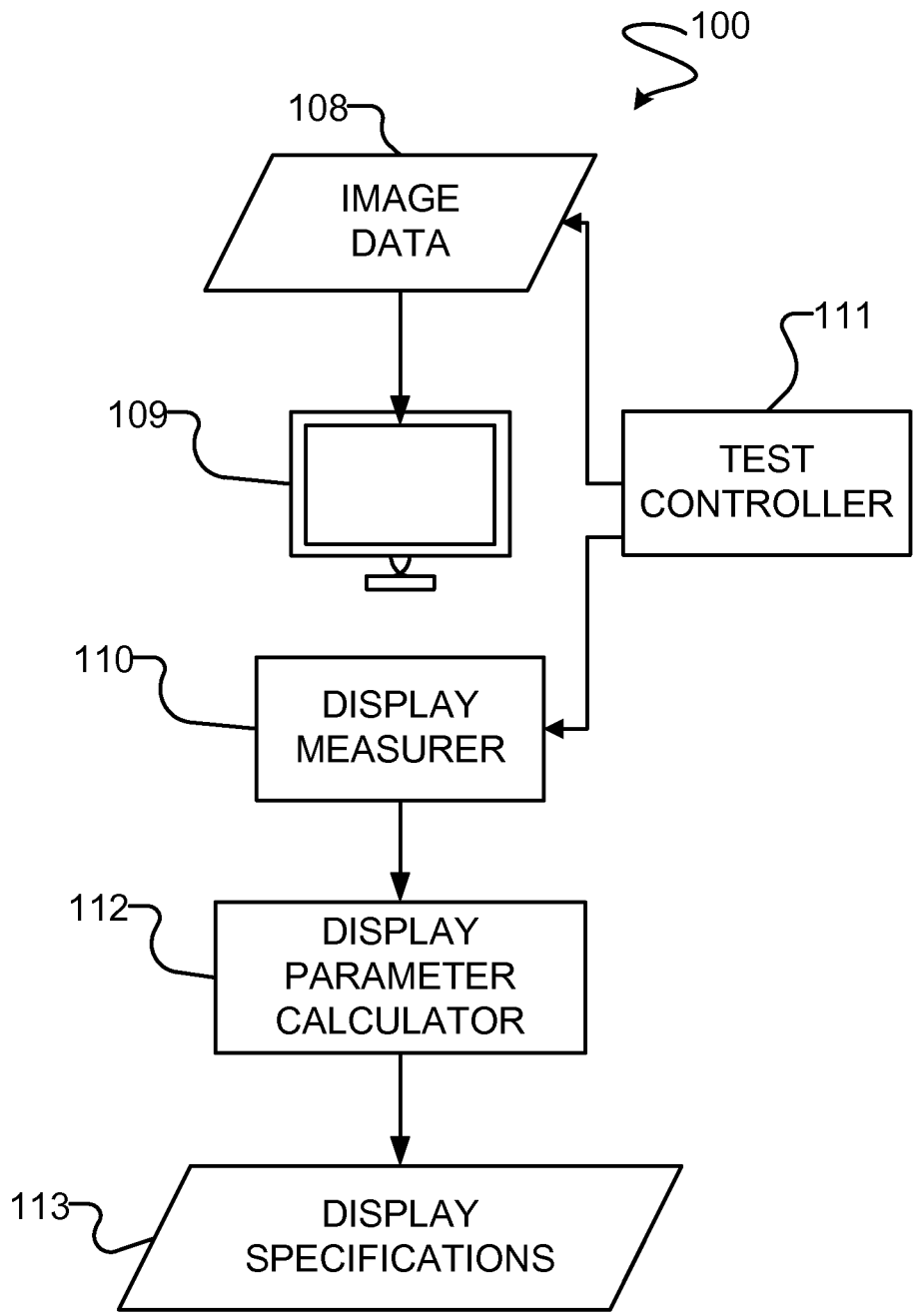
FIG. 10 illustrates an apparatus which can be used to determine display specifications for a particular target display.

FIG. 10 illustrates an apparatus 100 according to another example embodiment. Apparatus 100 may be applied to determine display specifications 112 for a particular target display 109.

Image data 108 is provided to target display 109. Image data 107 may comprise or consist of one or more test patterns that have different average illumination levels and/or include different amounts of primary colors. Non-limiting example test patterns that may be provided in image data 107 are as shown in FIGS. 3A, 3B, 3C, 3D, 3E, 3F, 8A, 8B, 8C and 8D.

Display measurer 110 comprises a light meter arranged to measure the light produced by the target display 109 at a particular location. Measurements from display measurer 110 are received at a display parameter calculator 112. Display parameter calculator 112 determines display parameters (e.g. parameters relating white level to average luminance or parameters relating desaturation of primary colors to levels of other primary colors) according to any of the systems and methods described herein. The resulting parameters may be applied as display specifications 113.

In the illustrated embodiment, a test controller 111 causes image data 108 comprising test patterns to be displayed on target display 109. Test controller 111 also controls display measurer 110 to measure the light output at the location of the target display 109 while each test pattern is displayed. display parameter calculator 112 determines relationships between display characteristics such as black level, white level and achievable color gamut as a function of image statistics such as average luminance, average luminance in each color channel, and the like.

It is not mandatory that image data 108 consist of constructed test patterns. In an alternative embodiment, image data 108 comprises a series of images over which image statistics vary in a known manner. For example image data 108 may be subjected to image analysis before or after it is displayed to determine the image statistics for the displayed images. Display measurer may measure characteristics of the displayed images such as black level for areas of the displayed images that are black, white level for areas of the displayed images that are white, chromaticities of areas of the displayed images made up of primary colors and the like. In such embodiments, display measurer 110 may comprise a calibrated high resolution camera, for example.

Apparatus according to other example embodiments comprises one or more data processors configured to perform any method as described above. In some embodiments the data processors are or comprise: software-programmable data processors executing software (which may include firmware) instructions which cause the processors to execute methods as described herein or parts of such methods. In other embodiments the data processors are or comprise configurable logic circuits configured to execute methods as described herein or parts of such methods. In other embodiments the data processors are or comprise hard-wired logic circuits connected to execute methods as described herein or parts of such methods. In other embodiments the data processors comprise combinations of two or more of the foregoing.

Technology as described herein has a wide range of applications. Apparatus and methods as described herein may optionally be incorporated into video processing and/or video distribution equipment such as: video encoders; video decoders; pre-processors for consumer or professional video encoders; consumer or professional video encoders; output device transforms for image interchange formats (IIFs) such as the Academy™ IIF; post-processors for consumer or professional decoders; pre-processors and post-processors for display management; displays; video players; video servers; and the like.

It is not practical to describe all possible applications. Non-limiting example applications include applying an emulation as described herein as a pre-processor prior to encoding and distributing video content. The pre-processor may emulate a reference display on which the video content was approved. In this example the video content has been produced and presented on a reference display. However, since no display is perfect, the reference display has not perfectly reproduced the video content. The content may not appear exactly as intended if the content is directly encoded and distributed for viewing on other displays with lesser and/or greater capabilities than the reference display (note that the capabilities of another display may be both greater and lesser than the capability of a reference display—for example, the other display may have a greater maximum luminance than the reference display but a smaller color gamut). By preprocessing to yield image data that emulates the actual appearance of the video content when viewed on the reference display. The modified image data input to the encoder has already accounted for the limitations of the reference display and thus can be reproduced as intended on another display, even if that other display has greater capabilities than the reference display.

In another example application the emulation is performed for a target display on which the image content will be viewed. The target display may, for example, comprise a 'lowest-common-denominator' target display. Pre-processing to generate modified image data emulating the content as it will appear when viewed on the target display may eliminate image nuances that the target display cannot reproduce. This may result in modified image data that can be encoded more efficiently (e.g. encoded to produce a smaller encoded output) while still preserving image features that affect the appearance of the content when viewed on the target display.

In another example, emulation as described herein may be performed in a pre-processor prior to performing additional image processing such as color management or an output data transformation (ODT). Such pre-processing may provide a more accurate model for the intended appearance of the content to a color management system (which may further adjust the content for viewing on a specific display that is the target of the color management system).

In another example, emulation as described herein may be performed in a post-processor, after performing image processing such as color management or an ODT. In this case the emulation may be applied to determine how a downstream target display will display the content.

In another example, emulation as described herein may be performed in a post-processor after a video decoder.

Some embodiments may provide reasonable estimate emulations of target displays in cases where the target displays are subject to one or more of the following conditions: power limiting (the brightness of a pixel is dependent on the total power load of an image); optical and digital flare (the brightness and/or color of a pixel is dependent on light contributed from neighboring pixels); virtual primaries (a color signal sent to a display is not achievable by a display, instead it is mapped into a signal within the capabilities of the display); and reflections (the brightness and/or color of a pixel is dependent on ambient light reflected from the panel). Ambient light conditions of the viewing environment may be measured with a sensor, or may be provided by the user selecting a particular setting (e.g. "bright room", "dark room", "sunny outdoors", "cloudy outdoors", etc.).

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Image processing and processing steps as described above may be performed in hardware, software (including 'firmware') in combination with a data processor to execute the software or suitable combinations of hardware and software. Certain implementations of the invention comprise computer processors which execute software instructions which cause the processors to perform a method of the invention. For example, one or more processors in a video workstation, set top box, display, video projector, transcoder or the like may implement methods as described herein by executing software instructions in a program memory accessible to the processors. For example, such image processing may be performed by a data processor (such as one or more microprocessors, graphics processors, digital signal processors or the like) executing software and/or firmware instructions which cause the data processor to implement methods as described herein. The software and other modules described herein may be executed by a general-purpose computer, e.g., a server computer or personal computer. Furthermore, aspects of the system can be embodied in a special purpose computer or data processor that is specifically programmed, configured, or constructed to perform one or more of the computer-executable instructions explained in detail herein. Such methods may also be performed by logic circuits which may be hard configured or configurable (such as, for example logic circuits provided by a field-programmable gate array "FPGA").

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, main-frame computers, and the like.

Software and other modules may be accessible via local memory, via a network, via a browser or other application in an ASP context, or via other means suitable for the purposes described herein. Examples of the technology can also be practised in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., containers) described herein may comprise computer files, variables, programming arrays, programming structures, or any electronic information storage schemes or methods, or any combinations thereof, suitable for the purposes described herein.

The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Where a component (e.g. a display, encoder, color grading device, software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The technology provided herein can be applied to systems other than the example systems described above. The elements and acts of the various examples described above can be combined to provide further examples. Aspects of the system can be modified, if necessary, to employ the systems, functions, and concepts of the various references described above to provide yet further examples of the technology.

From the foregoing, it will be appreciated that many alterations, modifications, additions and permutations are possible within the practice of this invention. Specific examples of systems, methods and apparatuses have been described herein for purposes of illustration. The embodiments described herein are only examples. Other example embodiments may be obtained, without limitation, by combining features of the disclosed embodiments. Embodiments described herein may be practised or implemented without all of the features ascribed to them. Such variations o2n described embodiments that would be apparent to the skilled addressee, including variations comprising mixing and matching of features from different embodiments, are within the scope of this invention.

What is claimed is:

1. An image processing method to emulate image content as it will appear when viewed on a target display, the method comprising:
receiving an input image prepared on a source display, wherein the source display has different display characteristics than the display characteristics of the target display;
obtaining one or more image statistics data of the input image;
accessing a display function that characterizes how the behavior of the target display changes in response to characteristics of an image being viewed on the target display;
computing based on the obtained image statistics data of the input image one or more parameters of the display function;
obtaining one or more color image statistics relating to relative proportions of primary colors in the input image by processing the input image;
accessing a second display function that characterizes how the behavior of the target display changes in response to characteristics of an image being viewed on the target display;
computing based on the obtained color image statistics data of the input image one or more parameters of the second display function; and
generating an output image based at least on the input image, the display function, the computed parameters of the display function, the second display function, and the computed parameters of the second display function,
wherein the input image comprises pixel values corresponding to each of red, green and blue primary colors, wherein computing the color image statistics comprise computing:

$$\frac{R}{R+G+B}$$

and $$\frac{G}{R+G+B}$$

and $$\frac{B}{R+G+B}$$

where R, G and B are respectively sums of the pixel values corresponding to each of red, green and blue primary colors for the whole input image or a local area within the input image.

2. The method of claim 1, wherein the image statistics comprise an average luminance of the input image.

3. The method of claim 1, wherein the image statistics are received together with the input image as metadata.

4. The method of claim 1, wherein the display function is related to the contrast, the black level, or the white level of the target display.

5. The method of claim 1, wherein the display function is characterized by an input output relationship $$L = \alpha V^{\gamma} + \beta,$$

wherein L is an output pixel value, V is an input pixel value, α is a parameter related to an estimated white level value of the target display, β is a parameter related to an estimated black level value of the target display, and γ is a parameter related to a gamma value of the target display.

6. The method of claim 5, comprising determining an average luminance for the input image and calculating β as a function of the average luminance.

7. The method of claim 5 wherein determining the average luminance for the input image is performed for a local area in the input image around a pixel with luminance V.

8. The method of claim 7 wherein the local area is made up of pixels in the input image within a predetermined radius of the pixel with luminance V.

9. The method of claim 5, further comprising:
determining an average luminance for the input image;
computing a value for α as a function of the average luminance for the input image;
determining a local average luminance for pixels of the input image in a local area of a pixel with luminance V; and
computing a value for β as a function of the local average luminance.

10. The method of claim 1, wherein the second display function comprises an input-output relationship of $$x'_R = x_R - g \times \frac{G}{R+G+B},$$

and $$y'_R = y_R - h \times \frac{B}{R+G+B},$$

wherein g and h are parameters of the second display function based on the response of the red channel primary to the green and blue channel primaries respectively, $(x_R, y_R)$ are input coordinates for the chromaticity of the red primary color on the target display, and $(x'_R, y'_R)$ are output values.

11. The method of claim 1, wherein the display function and its parameters are determined from measurements made on the target display using one or more test patterns.

12. The method of claim 11, wherein a test pattern comprises one or more black areas and one or more white areas, and determining the display function further comprises:
measuring white and black levels for the target display for each of a number of test patterns, each with a different average luminance;
fitting a suitable curve to the measuring results to obtain a first function relating black level output to average input luminance and a second function relating white level output to average input luminance.

13. The method of claim 1, wherein the second display function and its parameters are determined from measurements made on the target display using one or more test patterns.

14. The method of claim 13, wherein a test pattern comprises a first area in the center of a test image in a saturated first primary color surrounded by a second area in a mixture of a first primary color and a second primary color.

15. The method of claim 14, wherein the center area comprises a saturated red color and the surrounding area comprises a mixture of red and blue colors.

16. A non-transitory computer-readable storage medium having stored thereon computer-executable instructions for executing a method with a processor according to the method of claim 1.

17. An apparatus comprising a processor and configured to perform the method of claim 1.

* * * * *